(12) United States Patent
Saka et al.

(10) Patent No.: US 10,153,481 B2
(45) Date of Patent: Dec. 11, 2018

(54) NON-AQUEOUS ELECTROLYTE SECONDARY BATTERY

(71) Applicant: TOYOTA JIDOSHA KABUSHIKI KAISHA, Toyota-shi, Aichi (JP)

(72) Inventors: Hideyuki Saka, Toyota (JP); Hideaki Fujita, Kyotanabe (JP); Keiichi Takahashi, Nishinomiya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 188 days.

(21) Appl. No.: 14/589,414

(22) Filed: Jan. 5, 2015

(65) Prior Publication Data
US 2015/0194664 A1    Jul. 9, 2015

(30) Foreign Application Priority Data
Jan. 8, 2014 (JP) ................. 2014-001929

(51) Int. Cl.
| H01M 10/10 | (2006.01) |
| H01M 4/136 | (2010.01) |
| H01M 4/131 | (2010.01) |
| H01M 4/36 | (2006.01) |
| H01M 4/62 | (2006.01) |
| H01M 4/505 | (2010.01) |
| H01M 4/525 | (2010.01) |
| H01M 4/58 | (2010.01) |

(Continued)

(52) U.S. Cl.
CPC .......... *H01M 4/136* (2013.01); *H01M 4/131* (2013.01); *H01M 4/362* (2013.01); *H01M 4/366* (2013.01); *H01M 4/505* (2013.01); *H01M 4/525* (2013.01); *H01M 4/5825* (2013.01);

(Continued)

(58) Field of Classification Search
CPC ...... H01M 4/366; H01M 4/485; H01M 4/505; H01M 4/525; H01M 4/62; H01M 4/625; H01M 4/5825; H01M 4/136; H01M 4/13; H01M 4/364; H01M 4/131; H01M 4/362;

(Continued)

(56) References Cited

U.S. PATENT DOCUMENTS 5,744,258 A * 4/1998 Bai .................. H01M 4/04
429/209
2002/0004169 A1 1/2002 Yamada et al.
(Continued)

FOREIGN PATENT DOCUMENTS

| CN | 1320976 A | 11/2001 |
| CN | 101507013 A | 8/2009 |

(Continued)

*Primary Examiner* — Stephen J Yanchuk
(74) *Attorney, Agent, or Firm* — Sughrue Mion, PLLC

(57) ABSTRACT

Provided is a non-aqueous electrolyte secondary battery which exhibits excellent energy density and excellent input/output density (and especially output density in low SOC regions). This invention discloses a non-aqueous electrolyte secondary battery that includes a positive electrode, a negative electrode and a non-aqueous electrolyte. The positive electrode includes a positive electrode current collector and a positive electrode active material layers formed on the positive electrode current collector. The positive electrode active material layer has two regions that are demarcated in a surface direction of the positive electrode current collector, which are a first region 14*a* containing mainly a positive active material of lithium iron phosphate, and a second region 14*b* containing mainly a positive active material of a lithium-transition metal composite oxide.

12 Claims, 7 Drawing Sheets

(51) Int. Cl.
*H01M 10/052* (2010.01)
*H01M 10/0587* (2010.01)

(52) U.S. Cl.
CPC .......... *H01M 4/625* (2013.01); *H01M 10/052* (2013.01); *H01M 10/0587* (2013.01)

(58) Field of Classification Search
CPC .......... H01M 10/0525; H01M 10/052; H01M 10/0587; H01M 10/7011; Y02E 60/122
See application file for complete search history.

(56) References Cited

U.S. PATENT DOCUMENTS

| | | | |
|---|---|---|---|
| 2002/0094481 A1* | 7/2002 | Goto et al. | ............ H01M 42/52 429/218.1 |
| 2012/0129052 A1 | 5/2012 | Bauer et al. | |
| 2012/0196180 A1 | 8/2012 | Nakamura | |
| 2014/0186697 A1* | 7/2014 | Cobb | ...................... B29C 47/06 429/209 |
| 2015/0064559 A1* | 3/2015 | Oono | ................... H01M 4/366 429/221 |

FOREIGN PATENT DOCUMENTS

| | | |
|---|---|---|
| JP | 2001-307730 A | 11/2001 |
| JP | 3959929 B2 | 5/2007 |
| JP | 2011-60607 A | 3/2011 |
| JP | 2012094395 A | 5/2012 |
| JP | 2013-131322 A | 7/2013 |
| JP | 2014035919 A | 2/2014 |
| KR | 1020120018159 A | 2/2012 |
| WO | WO2013/146207 * | 3/2013 |

* cited by examiner

NON-AQUEOUS ELECTROLYTE SECONDARY BATTERY

BACKGROUND OF THE INVENTION

Field of the Invention

The present invention relates to a non-aqueous electrolyte secondary battery. More specifically, the present invention relates to a non-aqueous electrolyte secondary battery that includes lithium iron phosphate in a positive electrode.

Moreover, this application claims priority on the basis of Japanese Patent Application No. 2014-001929, which was filed on 8 Jan. 2014, and the entire contents of that application are incorporated by reference in this specification.

Description of the Related Art

In recent years, non-aqueous electrolyte secondary batteries have been widely used as so-called portable power sources for personal computers, hand-held terminals and the like and as power supplies for vehicle propulsion. Of these, lithium ion secondary batteries, which can achieve high energy density while being light weight, can be advantageously used as high output motive power sources in vehicles such as electric vehicles and hybrid vehicles.

Layered materials such as lithium-cobalt composite oxides ($LiCoO_2$) and lithium-nickel-cobalt-manganese composite oxides (for example $LiNi_{0.33}Co_{0.33}Mn_{0.33}O_2$), spinel type materials such as a lithium-manganese composite oxide ($LiMn_2O_4$) and olivine type materials such as lithium iron phosphate ($LiFePO_4$) are known as positive active material materials able to be used in such batteries. For example, Japanese Patent Application Laid-open No. 2001-307730 indicates that by using a composite material obtained by mixing a layered material ($LiCoO_2$) and an olivine type material ($LiFePO_4$) at a prescribed weight ratio as a positive active material, it is possible to achieve stable charging and discharging characteristics.

CITATION LIST

Patent Literature

Patent Document 1: JP 2001-307730 A

SUMMARY OF THE INVENTION

Here, non-aqueous electrolyte secondary batteries include, for example, batteries which require both high energy density and high output density, such as high output power sources fitted to vehicles. As a result of investigations, the inventors of this invention found that there was further room for improvement in cases where the features disclosed in Japanese Patent Application Laid-open No. 2001-307730 are used in this type of battery. That is, the lithium iron phosphate used as a positive active material in the invention disclosed in Japanese Patent Application Laid-open No. 2001-307730 exhibits somewhat lower electron conductivity than other types of positive active material. As a result, a large quantity of electrically conductive material must be used in order to reduce resistance in a positive electrode active material layer. Therefore, as the content proportion of the positive active material decreases, the capacity of the battery decreases and it can become difficult to achieve both high energy density and high output density.

With these circumstances in mind, the purpose of this invention is to provide a non-aqueous electrolyte secondary battery which includes lithium iron phosphate in a positive electrode and which can achieve significantly higher levels of energy density and input/output density (and especially output density in low SOC regions (for example, regions in which the SOC is 30% or lower)).

As a result of diligent research, the inventors of this invention found means for solving this problem and completed this invention. A non-aqueous electrolyte secondary battery provided by this invention (for example, a lithium ion secondary battery) includes a positive electrode, a negative electrode and a non-aqueous electrolyte. The positive electrode includes a positive electrode current collector and a positive electrode active material layer formed on the positive electrode current collector. In addition, the positive electrode active material layer has two regions that are demarcated in the surface direction of the positive electrode current collector, which are a first region containing mainly a positive active material consisting of lithium iron phosphate and a second region containing mainly a positive active material of a lithium-transition metal composite oxide.

The lithium iron phosphate has a lower driving potential than other positive active material materials and has an average charging and discharging potential of approximately 3.4 V (vs. $Li/Li^+$). As a result, by incorporating the lithium iron phosphate in the positive electrode active material layer, it is possible to achieve excellent input/output characteristics in low SOC regions. In addition, by additionally incorporating a lithium transition metal composite oxide in the positive electrode active material layer, it is possible to achieve a high capacity. Furthermore, by separating into a region containing mainly lithium iron phosphate and another region, it is possible to reduce the content proportion of electrically conductive material in the positive electrode active material layer. Therefore, according to the invention disclosed here, by providing a first region and a second region in the positive electrode active material layer, it is possible to maintain a high energy density while improving the input/output density across a wide range of SOC regions (including output density in low SOC regions, and especially output density in regions in which the SOC is 20% or lower).

In a preferred aspect of the non-aqueous electrolyte secondary battery disclosed here, an areal proportion of the first region is 3 to 20% when the total area of the positive electrode active material layer is 100%. By setting the areal proportion of the first region to be 3% or higher, it is possible to achieve high input/output density even under much harsher conditions, such as low temperatures and low SOCs. In addition, by setting the areal proportion of the first region to be 20% or lower, it is possible to stably ensure high battery capacity (energy density). Therefore, the effect of this invention can be exhibited to a high level.

The proportion of the positive active material of lithium iron phosphate can be 90 mass % or higher when the total solid content contained in the first region is 100 mass %. In this way, it is possible to achieve high levels of both energy density and input/output density.

In addition, the proportion of the positive active material consisting of lithium-transition metal composite oxide can be 90 mass % or higher if the total solid content contained in the second region is taken to be 100 mass %. In this way, it is possible to achieve high levels of both energy density and input/output density.

In a preferred aspect of the non-aqueous electrolyte secondary battery disclosed here, the positive active material of lithium iron phosphate is particulate. In addition, electrically conductive carbon is attached to the surface of particles of the positive active material of lithium iron phosphate. As mentioned above, lithium iron phosphate exhibits somewhat lower electron conductivity than other types of positive active material. Therefore, by attaching electrically conductive carbon to the surface of particles of the positive active material (typically by coating particles of the positive active material with electrically conductive carbon), it is possible to impart the particles with a suitable degree of electrical conductivity. As a result, it is possible to reduce the added quantity of electrically conductive material. Therefore, it is possible to increase the content proportion of the positive active material in the first region and achieve even higher energy density.

In a preferred aspect of the non-aqueous electrolyte secondary battery disclosed here, the positive electrode is a long positive electrode in which the positive electrode active material layer is formed along a longitudinal direction of the long positive electrode current collector. In addition, the first region is provided at one end of the positive electrode in the longitudinal direction. By providing a long positive electrode, it is possible to increase the capacity of the battery. In addition, by providing the first region at one end of the positive electrode in the longitudinal direction, it is possible to increase workability and production efficiency.

As mentioned above, the non-aqueous electrolyte secondary battery disclosed here (for example, a lithium ion secondary battery) achieves high levels of both energy density and input/output density. For example, it is possible to achieve high initial energy density and excellent output density across a wide range of SOC regions (for example, low SOC environments). Therefore, by making use of such characteristics, the non-aqueous electrolyte secondary battery disclosed here can be advantageously used as, for example, a driving power source (motive power source) for a vehicle such as a plug-in hybrid vehicle. That is, a vehicle provided with this non-aqueous electrolyte secondary battery is provided as another aspect disclosed here.

DESCRIPTION OF THE PREFERRED EMBODIMENTS

Figure 1:
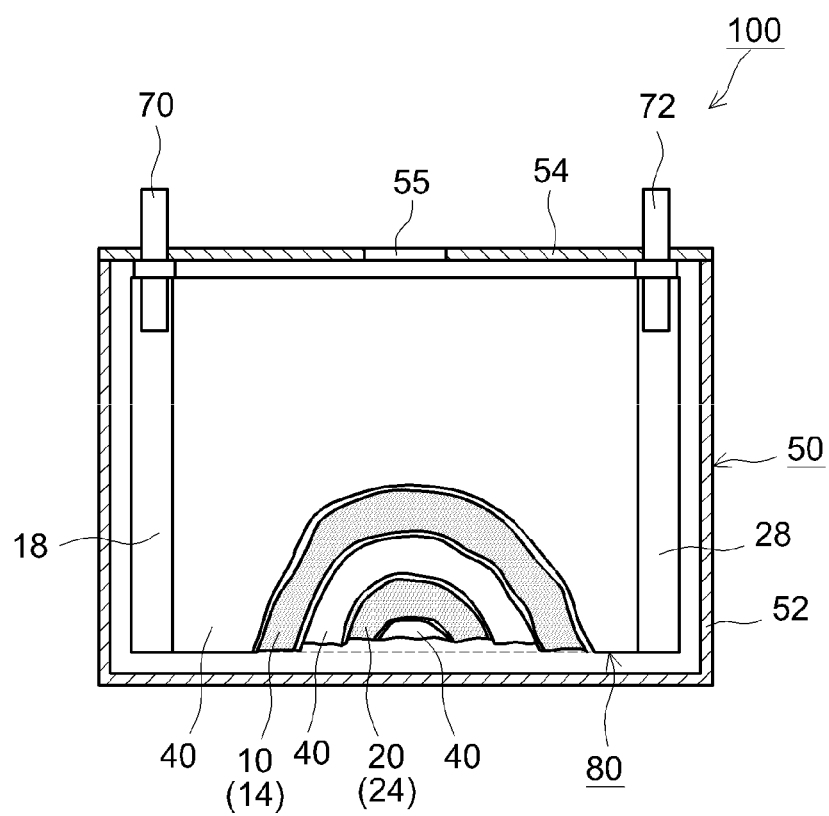
FIG. 1 is a longitudinal sectional view that schematically illustrates a cross section of a non-aqueous electrolyte secondary battery according to one embodiment of this invention.

Preferred embodiments of this invention will now be explained while referring to the drawings as appropriate. In the drawings shown below, members and parts having the same action are given the same reference symbols, and duplicate explanations may be omitted or simplified. Dimensions shown in the drawings (lengths, widths, thicknesses, and so on) do not necessarily reflect actual dimensions. Moreover, matters which are essential for carrying out the invention (for example, ordinary production processes that do not characterize this invention) and which are matters other than those explicitly mentioned in this specification (for example, the constitution of the positive electrode active material layer) are matters that a person skilled in the art could understand to be matters of design on the basis of the prior art in this technical field. This invention can be carried out on the basis of the matters disclosed in this specification and common general technical knowledge in this technical field.

The non-aqueous electrolyte secondary battery disclosed here includes a positive electrode, a negative electrode and a non-aqueous electrolyte. Although not intending to place particular limitations, this invention will now be explained in detail by using a non-aqueous electrolyte secondary battery that includes a flat wound electrode body and a non-aqueous electrolyte as one embodiment.

FIG. 1 is a longitudinal sectional view of a non-aqueous electrolyte secondary battery according to one embodiment of this invention. As shown in FIG. 1, a non-aqueous electrolyte secondary battery 100 according to this embodiment includes a flat rectangular (box-shaped) battery case 50, a wound electrode body 80 and a non-aqueous electrolyte that is not shown.

The non-aqueous electrolyte secondary battery 100 having this constitution can be constructed by, for example, first placing the electrode body 80 in the battery case 50 through an open part, attaching a lid 54 to the open part of the battery case, introducing the non-aqueous electrolyte via an introduction hole (not shown) provided in the lid 54, and then plugging this introduction hole.

«Battery Case 50»

The battery case 50 includes a flat rectangular battery case main body 52, the top of which is open, and the lid 54, which seals this open part. The upper surface (that is, the lid 54) of the battery case 50 includes a safety valve 55 for discharging gas generated inside the battery case to outside the case. The lid 54 is provided with a positive electrode terminal 70, which is electrically connected to a positive electrode active material layer-non-forming part 18 provided on the positive electrode 10 of the wound electrode body 80, and a negative electrode terminal 72, which is electrically connected to a negative electrode active material layer-non-forming part 28 provided on the negative electrode 20 of the wound electrode body 80.

The material of the battery case 50 can be, for example, a metal material such as aluminum or steel or a resin material such as a poly(phenylene sulfide) resin or a polyimide resin. In addition, the shape (external shape) of the battery case 50 may be, for example, circular (cylindrical, coin-shaped or button-shaped), hexahedral (cuboid or cubic), bag-shaped or a deformed shape obtained by processing these shapes.

«Wound Electrode Body 80»

Figure 2:
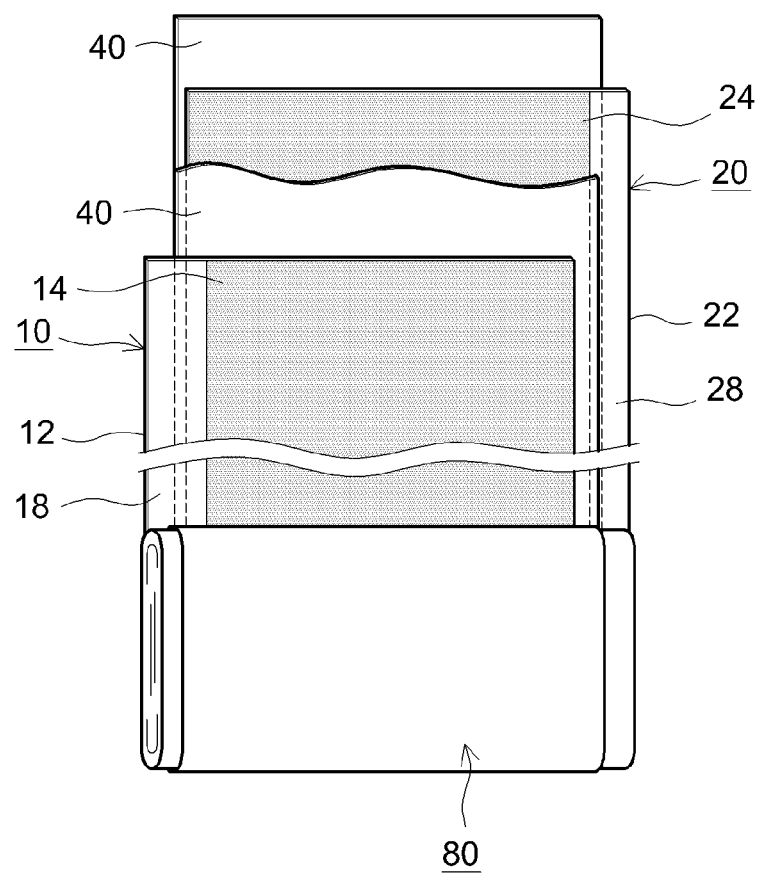
FIG. 2 is a schematic diagram that shows the constitution of a wound electrode body according to one embodiment of this invention.

FIG. 2 is a schematic diagram that shows the constitution of a wound electrode body according to one embodiment of this invention. As shown in FIG. 1 and FIG. 2, the wound electrode body 80 according to this embodiment includes a long sheet-shaped positive electrode (a positive electrode sheet) 10 and a long sheet-shaped negative electrode (a negative electrode sheet) 20. The positive electrode sheet 10 includes a long positive electrode current collector 12 and a positive electrode active material layer 14, which is provided on at least one surface (and typically both surfaces) of the long positive electrode current collector 12 and which is formed in the length direction of the long positive electrode current collector. The negative electrode sheet 20 includes a long negative electrode current collector 22 and a negative electrode active material layer 24, which is provided on at least one surface (and typically both surfaces) of the long negative electrode current collector 22 and which is formed in the length direction of the long negative electrode current collector. In addition, two long sheet-shaped separators 40, which prevent direct contact between the positive electrode active material layer 14 and the negative electrode active material layer 24, are provided as insulating layers between the positive electrode active material layer 14 and the negative electrode active material layer 24.

This type of wound electrode body 80 can be produced by, for example, winding a laminate obtained by, for example, overlaying the positive electrode sheet 10, a separator sheet 40, the negative electrode sheet 20 and a separator sheet 40 in that order in the length direction, and squeezing the obtained wound body from the sides so as to form a flat shape.

A tightly laminated wound core part, which is obtained by overlaying the positive electrode active material layer 14 formed on the surface of the positive electrode current collector 12 and the negative electrode active material layer 24 formed on the surface of the negative electrode current collector 22, is formed in the central part in the width direction (the short side direction), which is specified as the direction from one edge towards the other edge in the winding axis direction of the wound electrode body 80. The positive electrode active material layer-non-forming part 18 of the positive electrode sheet 10 and the negative electrode active material layer-non-forming part 28 of the negative electrode sheet 20 protrude outwards from the wound core part at both edges of the wound core part in the winding axis direction of the wound electrode body 80. In addition, a positive electrode current collector plate is provided on the protruding part 18 on the positive electrode side and is electrically connected to the positive electrode terminal 70 (see FIG. 1), and a negative electrode current collector plate is provided on the protruding part 28 on the negative electrode side and is electrically connected to the negative electrode terminal 72 (see FIG. 1).

<Positive Electrode Sheet 10>

The positive electrode sheet 10 of the non-aqueous electrolyte secondary battery disclosed here is formed by fixing the positive electrode active material layer 14 on the positive electrode current collector 12. The positive electrode current collector 12 is preferably an electrically conductive member consisting of a metal that exhibits good electrical conductivity (for example, aluminum, nickel or titanium).

The positive electrode active material layer 14 has two regions that are demarcated in the surface direction of the positive electrode current collector 12, namely a first region and a second region. Moreover, in the feature disclosed here, the first region and the second region should each be provided on a part of the positive electrode current collector in the surface direction of the positive electrode current collector, and the positional relationship, the sizes, and the like of the first region and the second region are not particularly limited. In addition, the positive electrode active material layer 14 may be constituted substantially from the first region and the second region, but may also have a third region in addition to the first region and the second region.

Figure 3:
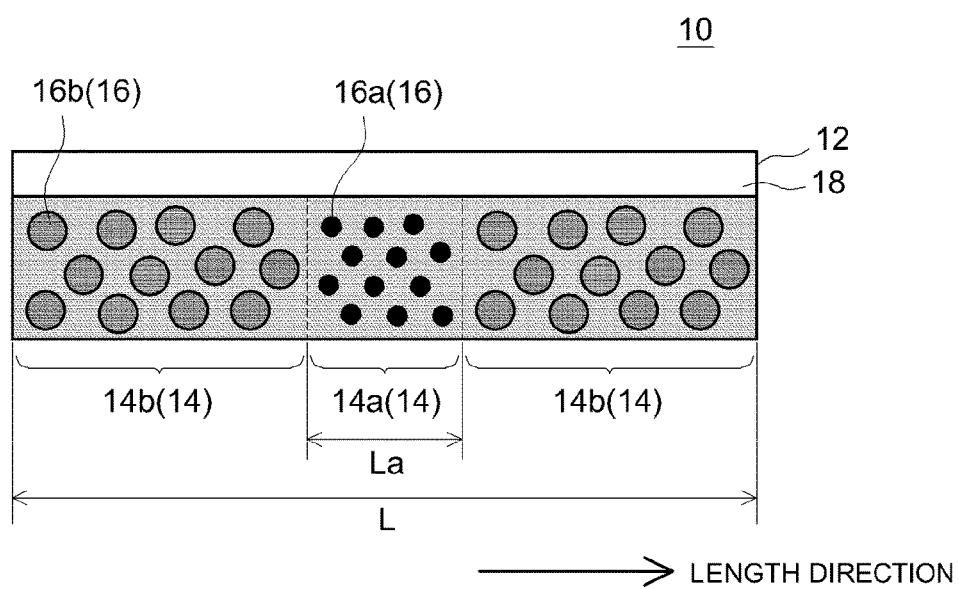
FIG. 3 is a planar view that schematically illustrates the constitution of a positive electrode sheet according to one embodiment of this invention.

FIG. 3 is a planar view that schematically illustrates the constitution of a positive electrode sheet according to one embodiment of this invention. In the embodiment shown in FIG. 3, the positive electrode sheet 10 includes the positive electrode current collector 12 and the positive electrode active material layer 14, which is fixed on the positive electrode current collector 12 and which contains a positive active material 16. In addition, the positive electrode active material layer-non-forming part 18 is provided in a band-like manner along one edge, in the width direction (the short side direction, which is the direction perpendicular to the length direction shown by the arrow in FIG. 3), of the positive electrode sheet 10. In addition, in those parts of the positive electrode current collector 12 other than the positive electrode active material layer-non-forming part 18, a band-like first region 14a is provided in the central part in the length direction (the long side direction that is shown by the arrow in FIG. 3), and a band-like second region 14b is provided on both end parts, that is, those parts other than this central part.

The first region 14a contains mainly a positive active material 16a consisting of lithium iron phosphate. The lithium iron phosphate has an olivine type crystal structure and has a lower theoretical capacity than other positive active material materials, but because phosphates form stable structures, little oxygen is released even at high temperatures and excellent thermal stability is achieved. In addition, the lithium iron phosphate has a lower driving potential than other positive active material materials and has an average charging and discharging potential of approximately 3.4 V (vs. Li/Li$^+$). As a result, excellent input/output characteristics can be achieved even in low SOC regions (for example, regions in which the SOC is 30% or lower). Furthermore, the lithium iron phosphate uses iron, which is plentiful in terms of resources and is inexpensive.

The lithium iron phosphate may be purchased as a commercially available product but may also be prepared using a conventional publicly known method. The properties of the lithium iron phosphate are not particularly limited, but the lithium iron phosphate is typically particulate (in the form of a powder), and the average primary particle diameter should be, for example, 10 to 500 nm (and typically 50 to 200 nm). In addition, the average secondary particle diameter should be, for example, 0.1 to 10 µm (and typically 0.5 to 5 µm). By setting the average primary particle diameter and average secondary particle diameter to fall within these ranges, it is possible to advantageously increase the electron conductivity of the lithium iron phosphate and form a good thick electrically conductive path in the positive electrode active material layer.

Moreover, in this specification "average particle diameter" means the arithmetic mean particle diameter obtained by observing at least 30 (for example, 30 to 100) particles using photographs obtained by an electron microscope (a scanning electron microscope (SEM) or a transmission electron microscope (TEM)).

Specifically, the positive electrode, which includes the positive electrode active material layer, is first removed from the battery case and separated from the other components. Next, the positive electrode is washed with an appropriate solvent (for example, EMC) so as to remove supporting electrolyte and the like. Next, the positive electrode is subjected to cross section exposure by cross sectional polishing, and this cross section is observed using an electron microscope. Next, the obtained image is analyzed by Energy Dispersive X-Ray Spectroscopy (EDX) (for example, mapping by elements inherent in the lithium iron phosphate (for example, iron (Fe))), and particles of the lithium iron phosphate are identified. The particle diameters of 30 or more (for example, 30 to 100) arbitrary particles are measured, and the average particle diameter can be determined by calculating the arithmetic mean of these diameters.

In a preferred aspect, electrically conductive carbon is attached to the surface of particles of the positive active material $16a$ consisting of lithium iron phosphate. In other words, in a preferred aspect, the first region $14a$ contains a positive active material consisting of lithium iron phosphate having electrically conductive carbon attached thereto (carbon-attached lithium iron phosphate). In this way, it is possible to impart the lithium iron phosphate with much higher electron conductivity.

Electrically conductive carbon such as various types of carbon black (for example, acetylene black, furnace black, ketjen black, and the like), coke coal, activated carbon, graphite, carbon fibers (PAN type carbon fibers and pitch-based carbon fibers), carbon nanotubes, fullerenes and graphenes can be advantageously used as the electrically conductive carbon. Of these, highly electrically conductive carbon black (typically acetylene black) is preferred. The properties of the electrically conductive carbon are not particularly limited, but it is preferable for the average particle diameter of the electrically conductive carbon to be smaller than that of the lithium iron oxide to which the electrically conductive carbon is attached. Furthermore, a smaller average primary particle diameter leads to a high specific surface area, ensures a greater area of contact between the electrically conductive carbon and the lithium iron phosphate, and is advantageous in terms of improving electron conductivity. Conversely, an electrically conductive material having a low average primary particle diameter tends to have a higher bulk density, which leads to concerns regarding a reduction in energy density. For these reasons, the average particle diameter of primary particles that constitute the electrically conductive carbon should fall within the range 1 to 200 nm (and typically 10 to 100 nm).

The attached quantity of the electrically conductive carbon should be 0.01 to 10 parts by mass (for example, 0.1 to 5 parts by mass) if the quantity of the lithium iron phosphate is taken to be 100 parts by mass. By setting this attached quantity to be 0.01 parts by mass or higher, it is possible to impart the lithium iron phosphate with high electrical conductivity. In addition, because the electrically conductive carbon has a lower bulk density than the lithium iron phosphate, as mentioned above, by setting the attached quantity of the electrically conductive carbon to be 10 parts by mass or lower, it is possible to prevent the bulk density of the carbon-attached lithium iron phosphate from being excessively reduced and it is also possible to achieve a significant increase in the density of the positive electrode active material layer.

In addition to the positive active material $16a$ consisting of the lithium iron phosphate, the first region $14a$ may, if necessary, contain materials able to be used as constituent components of positive electrode active material layers in ordinary non-aqueous electrolyte secondary batteries. Examples of such materials include electrically conductive materials and binders. Electrically conductive materials able to be advantageously used include carbon materials such as various types of carbon black (typically acetylene black and ketjen black), coke coal, activated carbon, graphite, carbon fibers and carbon nanotubes. In addition, binders able to be advantageously used include halogenated vinyl resins such as poly(vinylidene fluoride) (PVdF) resins and poly(alkylene oxide) compounds such as poly(ethylene oxide) (PEO).

It is appropriate for the proportion of the positive active material $16a$ relative to the overall first region $14a$ (the total quantity of solid components that constitute the first region $14a$) to be approximately 60 mass % or higher (typically 60 to 99 mass %), and this proportion should generally be approximately 70 to 95 mass %, for example 90 to 95 mass %. In cases where an electrically conductive material is used, the proportion of the electrically conductive material relative to the overall first region $14a$ can be, for example, approximately 1 to 20 mass %, and it is generally preferable for this proportion to be approximately 2 to 10 mass %. By reducing the quantity of the electrically conductive material as far as possible and increasing the content proportion of the positive active material, it is possible to further increase the capacity of the battery. In cases where a binder is used, the proportion of the binder relative to the overall first region $14a$ can be, for example, approximately 0.5 to 10 mass %, and it is generally preferable for this proportion to be approximately 1 to 5 mass %.

The second region $14b$ contains mainly a positive active material $16b$ consisting of a lithium-transition metal composite oxide. By using a lithium-transition metal composite oxide, it is possible to make up for the low energy density of the lithium iron phosphate and achieve a high battery capacity.

One or two or more materials known to be able to be used as positive active materials for non-aqueous electrolyte secondary batteries can be considered as the lithium-transition metal composite oxide. Preferred examples thereof include layered and spinel type lithium-transition metal composite oxides. Specific examples thereof include lithium-cobalt composite oxide-based materials such as $LiCoO_2$, lithium-nickel composite oxide-based materials such as $LiNiO_2$, lithium-nickel-manganese composite oxide-based materials such as $LiNi_{0.5}Mn_{1.5}O_4$ and $LiNi_{0.33}Co_{0.33}Mn_{0.33}O_2$, and lithium-manganese spinel type materials such as $LiMn_2O_4$. Of these, a lithium-nickel-cobalt-manganese composite oxide having a layered structure and containing Li, Ni, Co and Mn is preferred from perspectives such as thermal stability and energy density. The properties of the lithium-transition metal composite oxide are not particularly limited, but the lithium-transition metal composite oxide is typically particulate (in the form of a powder) and should have, for example, an average secondary particle diameter of 20 μm or lower (typically 0.1 to 20 μm, for example 1 to 10 μm). In this way, it is possible to achieve a second region $14b$ which is compact, exhibits excellent electrical conductivity and retains suitable voids.

Moreover, like the first region $14a$, the second region $14b$ may, if necessary, contain materials able to be used as constituent components of positive electrode active material layers in ordinary non-aqueous electrolyte secondary batteries (for example, the above-mentioned electrically conductive materials or binders) in addition to the positive active material $16b$ consisting of the lithium-transition metal composite oxide.

It is appropriate for the proportion of the positive active material $16b$ relative to the overall second region $14b$ (the total quantity of solid components that constitute the second region $14b$) to be approximately 60 mass % or higher (typically 60 to 99 mass %), and this proportion should generally be approximately 70 to 95 mass %, for example 90 to 95 mass %. In cases where an electrically conductive material is used, the proportion of the electrically conductive material relative to the overall second region $14b$ can be, for example, approximately 1 to 20 mass %, and it is generally preferable for this proportion to be approximately 2 to 10 mass %. In cases where a binder is used, the proportion of the binder relative to the overall second region 14b can be, for example, approximately 0.5 to 10 mass %, and it is generally preferable for this proportion to be approximately 1 to 5 mass %.

In a preferred aspect of this invention, if the overall area of the positive electrode current collector 12 on which the positive electrode active material layer 14 is formed is taken to be 100%, the areal proportion of the first region 14a is 1 to 30% (for example, 3 to 20%). By limiting the areal proportion of the first region 14a to 30% or lower (and preferably 20% or lower), it is possible to achieve a higher energy density. In addition, by setting the areal proportion of the first region 14a to be 1% or higher (and preferably 3% or higher), it is possible to improve the input/output characteristics (and especially the output density in low SOC regions) while maintaining battery capacity.

In addition, according to investigations by the inventors of this invention, by setting the areal proportion of the first region 14a to be 1 to 5% (for example, 3 to 5%) of the overall positive electrode active material layer 14, it is possible to achieve an even higher energy density. In addition, by setting the areal proportion of the first region 14a to be 5 to 30% (typically 5 to 20%, for example 10 to 20%) of the overall positive electrode active material layer 14, it is possible to achieve even higher input/output density in low SOC regions. In this way, the areal ratio of the first region and the second region should be adjusted according to the intended use or application of the battery, and so on.

In the embodiment shown in FIG. 3, the length (La) of the formed first region 14a is not particularly limited. For example, in cases where the positive electrode active material layer 14 is formed on only one of the front or rear surfaces of the positive electrode current collector 12, if the overall length from one end to the other end in the length direction of the positive electrode active material layer 14 is denoted by L, the first region 14a should be disposed in a band-like manner (parallel to the edge of the short side of the positive electrode current collector 12) in such a way that the length (La) of the first region 14a in the length direction is generally 3% or more (typically 5% or more, for example 10% or more) and 20% or less (typically 15% or less) of the overall length (L). In addition, in cases where the positive electrode active material layer 14 is formed on both the front and rear surfaces of the positive electrode current collector 12, for example, the overall length from one end to the other end in the length direction of the positive electrode active material layer 14 is the overall length on both surfaces is twice as long (2L). Therefore, the first region 14a should be disposed in a band-like manner (parallel to the edge of the short side of the positive electrode current collector 12) in such a way that the length of the first region 14a in the length direction is approximately 6% or more (typically 10% or more, for example 20% or more) and 40% or less (typically 30% or less) of the overall length (2L). In this way, the effect of this invention can be exhibited to a higher level.

Figure 4:
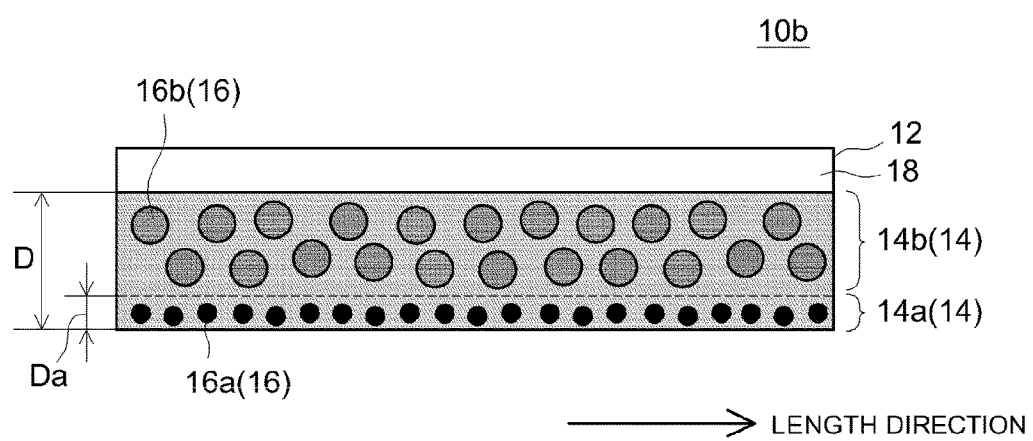
FIG. 4 is a planar view that schematically illustrates the constitution of a positive electrode sheet according to another embodiment of this invention.

FIG. 4 is a planar view that schematically illustrates the constitution of a positive electrode sheet according to another embodiment of this invention. In the embodiment shown in FIG. 4, a positive electrode sheet 10b includes the positive electrode current collector 12 and the positive electrode active material layer 14, which is fixed on the positive electrode current collector 12 and which contains at least the positive active material 16. In addition, the positive electrode active material layer-non-forming part 18 is provided along one edge, in the width direction (the short side direction, which is the direction perpendicular to the length direction shown by the arrow in FIG. 4), of the positive electrode sheet 10. In addition, the first region 14a, which contains mainly the positive active material 16a consisting of lithium iron phosphate, is disposed along the other edge of the positive electrode sheet. In addition, the second region 14b, which contains mainly the positive active material 16b consisting of a lithium-transition metal composite oxide, is disposed in the central part in the width direction, which is sandwiched between the positive electrode active material layer-non-forming part 18 and the first region 14a.

In the embodiment shown in FIG. 4, the width (Da) of the formed first region 14a is not particularly limited, but in cases where the positive electrode active material layer 14 is formed on only one of the front or rear surfaces of the positive electrode current collector 12, for example, if the width from one edge to the other edge in the width direction of the positive electrode active material layer 14 is denoted by D, the first region 14a should be disposed in a band-like manner (parallel to the edge of the long side of the positive electrode current collector 12) in such a way that the length (Da) of the first region 14a in the width direction is generally 3% or more (typically 5% or more, for example 10% or more) and 20% or less (typically 15% or less) of the overall width (D). In addition, in cases where the positive electrode active material layer 14 is formed on both the front and rear surfaces of the positive electrode current collector 12, for example, the overall length from one edge to the other edge in the width direction of the positive electrode active material layer is the overall length on both surfaces is twice as long (2D). Therefore, the first region 14a should be disposed in a band-like manner (parallel to the edge of the long side of the positive electrode current collector 12) in such a way that the length of the first region 14a in the width direction is approximately 6% or more (typically 10% or more, for example 20% or more) and 40% or less (typically 30% or less) of the overall length (2D). In this way, the effect of this invention can be exhibited to a higher level.

Moreover, in the aspects shown in FIG. 3 and FIG. 4, the first region 14a and the second region 14b are each disposed (in a band-like manner) so as to be parallel to the edges of the positive electrode current collector 12, but this invention is not limited to these aspects, and it is possible to dispose the first region 14a and the second region 14b in a checkerboard pattern or the like.

In addition, the properties (for example, the thickness and density) of the positive electrode active material layer 14 may be substantially the same as, or different from, those of the first region 14a and the second region 14b. For example, the average thickness of the first region 14a and/or the second region 14b should be 30 µm or higher (for example, 50 µm or higher) and 100 µm or lower (for example, 80 µm or lower) for each surface of the positive electrode current collector 12. In addition, from perspectives such as electrolyte retention and energy density, the density of the first region 14a and/or the second region 14b may be 1 g/cm$^3$ or higher (typically 1.5 g/cm$^3$ or higher) and 4.5 g/cm$^3$ or lower (for example, 3.5 g/cm$^3$ or lower).

The method for producing this type of positive electrode sheet 10 is not particularly limited, but one method is to, for example, first prepare two types of slurry (a first region-forming slurry and a second region-forming slurry) by dispersing the positive active materials and materials that may be required if necessary in appropriate solvents. Next, the first region 14a is formed by applying one of the slurries (for example, the first region-forming slurry) to a part of a surface of the long positive electrode current collector 12, and then drying the slurry. Next, the second region 14b is formed by applying the other slurry (for example, the second region-forming slurry) to a part of the surface of the long positive electrode current collector 12 on which the first region 14a was not formed. Another method is to set the two types of slurry in a double die having two slurry discharge outlets, apply the slurries to the required parts by extruding the required slurry from the two discharge outlets, and then drying the slurries. By using this method, the first region 14a and the second region 14b can be formed at once. This is preferred from perspectives such as workability and productivity. Finally, the properties (thickness, density, and so on) of the positive electrode active material layer 14 are adjusted by pressing. In this way, it is possible to produce the positive electrode sheet 10 having the first region 14a and the second region 14b on the surface of the positive electrode current collector 12.

<Negative Electrode Sheet 20>

The negative electrode sheet 20 is formed by fixing the negative electrode active material layer 24 on the negative electrode current collector 22. This type of negative electrode sheet 20 can be produced by using, for example, the method described above for producing the positive electrode sheet 10. The negative electrode current collector 22 is preferably an electrically conductive material consisting of a metal that exhibits good electrical conductivity (for example, copper or nickel).

The negative electrode active material layer 24 contains at least a negative active material. A variety of materials known to be able to be used as negative active materials in non-aqueous electrolyte secondary batteries can be considered as the negative active material. Preferred examples thereof include carbon materials having a graphite structure (a layered structure) in at least a part of the material, such as graphite, poorly graphitizable carbon (hard carbon), readily graphitizable carbon (soft carbon) and carbon materials having a structure obtained by combining these forms. Of these, graphite-based materials are preferred from the perspective of energy density.

In addition to the negative active material mentioned above, the negative electrode active material layer 24 may, if necessary, contain materials able to be used as constituent components of negative electrode active material layers in ordinary non-aqueous electrode secondary batteries. Examples of such materials include binders and a variety of additives. Styrene butadiene rubbers (SBR), poly(vinylidene fluoride) (PVdF), polytetrafluoroethylene (PTFE), and the like can be advantageously used as binders. In addition, a variety of additives, such as thickening agents, dispersing agents and electrically conductive materials, can be used as appropriate, and carboxymethyl cellulose (CMC), methyl cellulose (MC), and the like can be advantageously used as thickening agents.

It is appropriate for the proportion of the negative active material in the overall negative electrode active material layer 24 to be approximately 50 mass % or higher, and it is generally preferable for this proportion to the 90 to 99 mass % (for example, 95 to 99 mass %). In cases where a binder is used, the proportion of the binder relative to the overall negative electrode active material layer 24 can be, for example, approximately 1 to 10 mass %, and it is generally preferable for this proportion to be approximately 1 to 5 mass %.

<Separator Sheet 40>

The separator sheet 40 disposed between the positive and negative electrode sheets (10 and 20) can be a variety of porous sheets similar to separators used in ordinary non-aqueous electrolyte secondary batteries. Preferred examples thereof include porous resin sheets (films, non-woven fabrics, and the like) consisting of resins such as polyethylene (PE) and polypropylene (PP). This type of porous resin sheet may have a single layer structure or a multilayer structure having two or more layers (for example, a three layer structure obtained by laminating a PP layer on both surfaces of a PE layer (PP/PE/PP)). In addition, from perspectives such as electrolyte retention and lowering resistance, the average thickness of the porous resin sheet should be approximately 10 to 40 μm.

«Non-Aqueous Electrolyte»

The non-aqueous electrolyte is typically a liquid (a non-aqueous electrolyte liquid) obtained by dissolving or dispersing a supporting electrolyte (for example, a lithium salt, sodium salt, magnesium salt, or the like, and a lithium salt in the case of a lithium ion secondary battery) in a non-aqueous solvent. Alternatively, it is possible to use a solid electrolyte (typically a so-called gel) obtained by adding a polymer to a non-aqueous electrolyte liquid.

It is possible to select and use a supporting electrolyte similar to those used in ordinary non-aqueous electrolyte secondary batteries. For example, it is possible to use lithium salts such as $LiPF_6$, $LiBF_4$, $LiClO_4$, $LiAsF_6$, $Li(CF_3SO_2)_2N$ and $LiCF_3SO_3$, and of these, $LiPF_6$ can be advantageously used. The concentration of the supporting electrolyte should generally be adjusted within the range 0.7 to 1.3 mol/L.

The non-aqueous solvent is not particularly limited, and can be an organic solvent such as a carbonate compound, an ether compound, an ester compound, a nitrile compound, a sulfone compound or a lactone compound, which are used in ordinary non-aqueous electrolyte secondary batteries. Specific examples thereof include ethylene carbonate (EC), propylene carbonate (PC), diethyl carbonate (DEC), dimethyl carbonate (DMC), ethyl methyl carbonate (EMC).

The non-aqueous electrolyte secondary battery disclosed here can be used in a variety of applications, but is characterized by exhibiting a high battery capacity and excellent input/output characteristics even in harsh environments (for example, low SOC environments and low temperature environments). Therefore, by making use of such characteristics, the non-aqueous electrolyte secondary battery disclosed here can be advantageously used in applications that require high energy density or high input/output density. Examples of such applications include motive power sources (power supplies) for motors fitted to vehicles such as plug-in hybrid vehicles, hybrid vehicles and electric vehicles. Moreover, this type of non-aqueous electrolyte secondary battery is typically used in the form of a battery pack in which a plurality of batteries are connected in series and/or in parallel.

A number of working examples relating to this invention will now be explained, but this invention is in no way limited to these specific examples.

Production of Positive Electrode

Examples 1 to 5

A second region-forming slurry relating to these examples (slurry A2) was prepared by weighing out a powder of $Li[Ni_{0.33}Co_{0.33}Mn_{0.33}]O_2$ (average particle diameter: 6 μm, NCM) as a positive active material, poly(vinylidene fluoride) (PVdF) as a binder and acetylene black (AB) as an electrically conductive material so that the mass ratio of these materials was active material (NCM):PVdF:AB=(97−X):3:X (the value of X is indicated in the "Electrically conductive material content (X)" column in Table 1), and mixing with N-methylpyrrolidone (NMP).

A positive electrode sheet (examples 1 to 5, overall thickness 120 µm) including a positive electrode active material layer consisting only of a second region was obtained by coating the slurry A2 in a band-like manner at a prescribed width and length on both surfaces of a long aluminum foil (a positive electrode current collector) having a thickness of approximately 15 µm by using a double die, drying the slurry (for 1 minute at a drying temperature of 80° C.) and then rolling by means of a roller pressing machine.

Examples 6 to 10

A first region-forming slurry relating to these examples (slurry A1) was prepared by weighing out a powder of $LiFePO_4$ (average secondary particle diameter: 1 µm, coated with 1 part by mass of carbon, LFPO) as a positive active material, poly(vinylidene fluoride) (PVdF) as a binder and acetylene black (AB) as an electrically conductive material so that the mass ratio of these materials was active material (LFPO):PVdF:AB=(97−X):3:X (the value of X is indicated in the "Electrically conductive material content (X)" column in Table 1), and mixing with N-methylpyrrolidone (NMP).

A positive electrode sheet (examples 6 to 10, overall thickness 120 µm) was then obtained by forming a positive electrode active material layer consisting only of a first region in the same way as for Examples 1 to 5, except that slurry A1 was used instead of slurry A2.

Examples 11 to 13

A mixture was prepared by weighing out and mixing a powder of $LiFePO_4$ and a powder of $Li[Ni_{0.33}Co_{0.33}Mn_{0.33}]O_2$ as positive active materials so that the active material mass ratio (LFPO:NCM)=10:90. A slurry relating to these examples (slurry A12) was prepared by weighing out this mixture, poly(vinylidene fluoride) (PVdF) as a binder and acetylene black (AB) as an electrically conductive material so that the mass ratio of these materials was NCM:PVdF:AB=(97−X):3:X (the value of X is indicated in the "Electrically conductive material content (X)" column in Table 1), and mixing with N-methylpyrrolidone (NMP).

A positive electrode sheet (examples 11 to 13, overall thickness 120 µm) was then obtained by forming a positive electrode active material layer consisting of this mixture in the same way as for Examples 1 to 5, except that slurry A12 was used instead of slurry A2.

Examples 14 to 25

Figure 5:
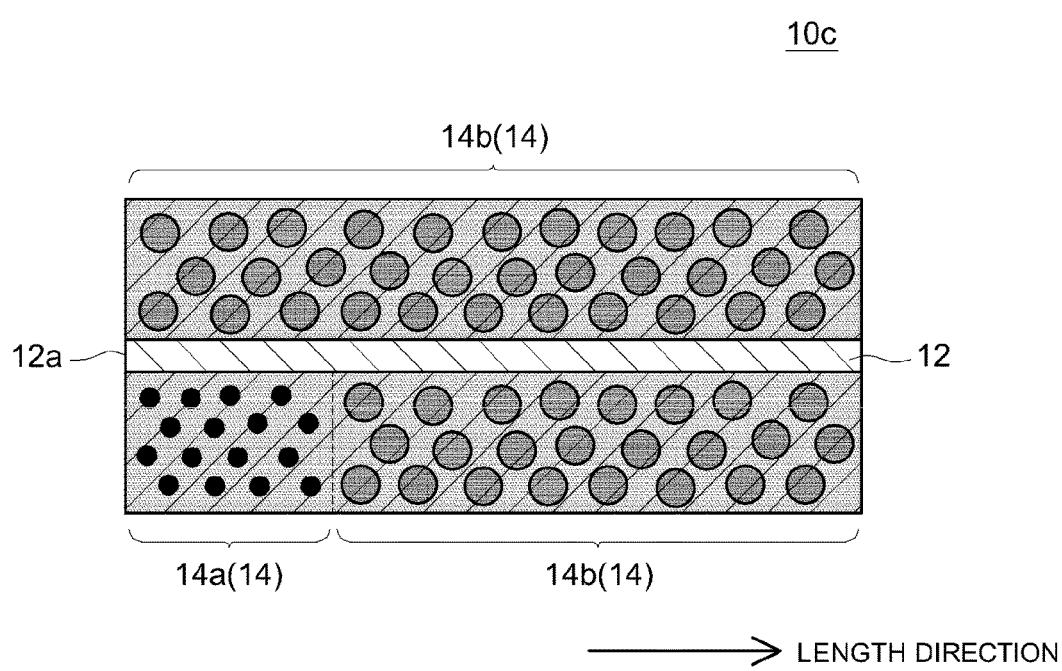
FIG. 5 is a cross sectional view that schematically illustrates the constitution of a positive electrode sheet according to examples 14 to 25.

FIG. 5 is a cross sectional view that schematically illustrates the constitution of a positive electrode sheet according to examples 14 to 25. That is, a positive electrode sheet 10c according to Examples 14 to 25 includes the positive electrode active material layer 14, which consists of the first region 14a and the second region 14b, formed on the positive electrode current collector 12. This type of positive electrode sheet 10c was prepared as follows.

First, the slurries A1 and A2 were prepared in the same way as in Examples 1 to 10. Next, the first region 14a was formed by coating the slurry A1 in a band-like manner at a prescribed width and length from one end (the leader) 12a on one surface of a long aluminum foil (a positive electrode current collector) 12, and then drying the slurry (for 1 minute at a drying temperature of 80° C.). Next, the second region 14b was formed by coating the slurry A2 in a band-like manner at a prescribed width and length on the remainder of the aluminum foil, and then drying the slurry (for 1 minute at a drying temperature of 80° C.). In addition, only the second region 14b was formed on the other surface of the positive electrode current collector 12 by coating the slurry A2 in a band-like manner at a prescribed width and length, and then drying the slurry (for 1 minute at a drying temperature of 80° C.). Here, the width and length of the first region 14a and the second region 14b were adjusted so that the areal proportions of the two regions had the values indicated in the "Areal proportion" column in Table 1. In Examples 14 to 16, for example, the first region 14a and the second region 14b were prepared in such a way that the areal proportion of the first region 14a was 3% and the areal proportion of the second region 14b was 97% relative to the overall positive electrode active material layer 14 provided on both surfaces of the positive electrode current collector 12. A positive electrode sheet including the positive electrode active material layer 14 consisting of the first region 14a and the second region 14b (Examples 14 to 25, overall thickness 120 µm) was obtained by forming the positive electrode active material layer in this way and then rolling by means of a roller pressing machine.

<Production of Non-Aqueous Electrolyte Secondary Battery>

Next, a negative electrode active material layer-forming slurry was prepared by mixing graphite (C) as a negative active material, a styrene butadiene rubber (SBR) as a binder and carboxymethyl cellulose (CMC) as a thickening agent in ion exchanged water so that the mass ratio of these materials was active material (C):SBR:CMC=98:1:1. A negative electrode sheet (overall thickness 130 µm) was obtained by coating this slurry in a band-like manner on both surfaces of a long copper foil having a thickness of approximately 10 µm (a negative electrode current collector), drying the slurry (for 1 minute at a drying temperature of 120° C.) and then rolling by means of a roller pressing machine.

Next, a flat wound electrode body was prepared by disposing the obtained positive electrode sheet (Examples 1 to 25) and the negative electrode sheet so as to face each other with a separator sheet interposed therebetween, and then winding. Moreover, a separator sheet having a three layer structure (having an overall thickness of 24 µm) and obtained by laminating a polypropylene (PP) layer on both surfaces of a polyethylene (PE) layer was used as the separator sheet.

Next, a current collector plate was welded onto both ends (the current collector ends) of the obtained wound electrode body (Examples 1 to 25), this welded assembly was placed in an aluminum battery case, and a lid was welded onto the main body of the battery case. Next, a non-aqueous electrolyte liquid was introduced from an introduction hole provided in the lid, and a sealing screw was then screwed into the introduction hole. A non-aqueous electrolyte liquid obtained by dissolving $LiPF_6$ as a supporting electrolyte at a concentration of 1 mol/L in a mixed solvent containing ethylene carbonate (EC), dimethyl carbonate (DMC) and ethyl methyl carbonate at a EC:DMC:EMC volume ratio of 3:3:4 was used as the non-aqueous electrolyte liquid. In this way, a square non-aqueous electrolyte secondary battery (theoretical capacity: 25 Ah) was constructed.

TABLE 1

| | Areal proportion (%) | | Electrically conductive material content (X mass %) | | Initial capacity (relative value) (25° C.) (%) | 10 second output (relative value) (−15° C., SOC 20%) (%) |
|---|---|---|---|---|---|---|
| | First region | Second region | A1 | A2 | | |
| Example 1 | — | 100 | — | 3 | 101.9 | 84.8 |
| Example 2 | | | — | 4 | 100.9 | 91.7 |
| Example 3 | | | — | 5 | 100 | 100 |
| Example 4 | | | — | 6 | 99.1 | 102.0 |
| Example 5 | | | — | 7 | 98.2 | 102.5 |
| Example 6 | 100 | — | 3 | — | 96.8 | 93.3 |
| Example 7 | | | 4 | — | 95.9 | 105.5 |
| Example 8 | | | 5 | — | 95.0 | 163.6 |
| Example 9 | | | 6 | — | 94.1 | 181.8 |
| Example 10 | | | 7 | — | 93.3 | 185.9 |
| Example 11 | Mixture of A1 (10%) + A2 (90%) | | 5 | | 99.5 | 114.2 |
| Example 12 | | | 6 | | 98.6 | 131.3 |
| Example 13 | | | 7 | | 97.7 | 135.4 |
| Example 14 | 3 | 97 | 5 | 5 | 99.8 | 104.2 |
| Example 15 | | | 6 | 5 | 99.8 | 113.1 |
| Example 16 | | | 7 | 5 | 99.8 | 114.7 |
| Example 17 | 5 | 95 | 5 | 5 | 99.7 | 111.1 |
| Example 18 | | | 6 | 5 | 99.7 | 122.2 |
| Example 19 | | | 7 | 5 | 99.7 | 124.4 |
| Example 20 | 10 | 90 | 5 | 5 | 99.5 | 119.2 |
| Example 21 | | | 6 | 5 | 99.4 | 139.4 |
| Example 22 | | | 7 | 5 | 99.3 | 145.4 |
| Example 23 | 20 | 80 | 5 | 5 | 99.0 | 166.8 |
| Example 24 | | | 6 | 5 | 98.8 | 187.9 |
| Example 25 | | | 7 | 5 | 98.7 | 191.8 |

[Evaluation of Battery Capacity (Initial Capacity)]

The battery capacities of the batteries of Examples 1 to 25, which were constructed as described above, were determined from discharge curves obtained by carrying out initial charging and discharging within the range 4.1 to 3.0 V at a constant current of 0.2 C in an environment having a temperature of 25° C. The results are shown in the corresponding column in Table 1. Moreover, Table 1 shows relative values, with the discharge capacity of Example 3 being 100. That is, it can be said that a larger value indicates a battery having a higher energy density.

[Evaluation of Output Characteristics]

The batteries of Examples 1 to 25, which were constructed as described above, were allowed to stand for 3 hours in an environment having a temperature of −15° C. so as to stabilize the temperature inside the battery. Next, the SOC values of the batteries were adjusted to 20% at this temperature, the batteries were subjected to constant power discharge at different rates, and the time (seconds) until the battery voltage reached 2.5 V was measured. In addition, the 10 second output was determined from a primary approximation line on a plot of time required for discharge (seconds) against power (W). The results are shown in the corresponding column in Table 1. Moreover, Table 1 shows relative values, with the 10 second output of Example 3 being 100. That is, it can be said that a larger value indicates a battery having a higher output density.

As shown in Table 1, the initial capacity decreases as the content of electrically conductive material increases in Examples 1 to 5, in which only NCM was used as the positive active material. In addition, it was understood that stable output characteristics can be achieved by setting the content of electrically conductive material to be 5 mass % or higher.

In Examples 6 to 10, in which only LFPO was used as the positive active material, the initial capacity was reduced but the output characteristics were significantly improved as the content of electrically conductive material increased, and it was understood that generally stable output characteristics can be achieved by setting the content of electrically conductive material to be 7 mass % or higher. It is thought that a higher quantity of electrically conductive material is required in these cases because the LFPO has lower electrical conductivity and a smaller particle diameter than the NCM.

In Examples (of mixture) 11 to 13, in which a mixture of NCM and LFPO was used as the positive active material, output characteristics improved as the content of electrically conductive material increased, but it was found that the initial capacity was reduced.

Conversely, in Examples 14 to 25, in which the first region contained LFPO and the second region contained NCM, it was possible to achieve an improvement in output characteristics while suppressing a decrease in initial capacity. For example, by setting the ratio of the area of the first region to the area of the second region to be between 3:97 and 20:80 (and preferably between 5:95 and 10:90), it was possible to achieve an improvement in output of at least +4% (and preferably at least +10%) while maintaining at least 98% (and preferably at least 99%) of the battery capacity compared to the battery of Example 3, in which only NCM was used. These results indicate the technical significance of this invention.

Figure 6:
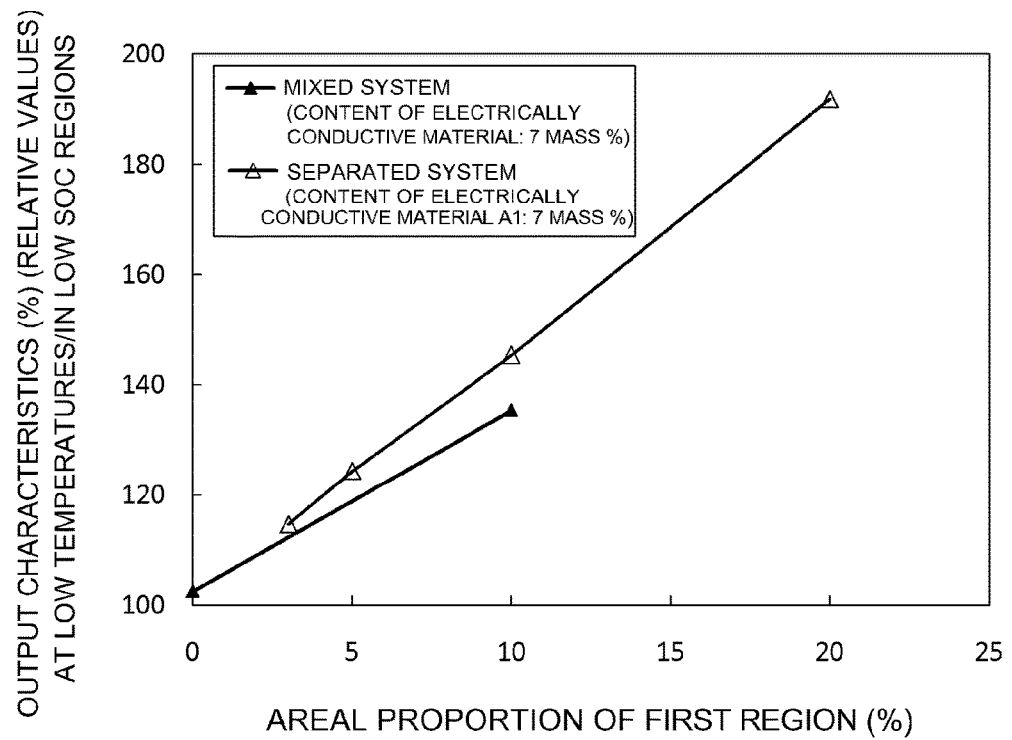
FIG. 6 is a graph that shows the relationship between the areal proportion of the first region in the positive electrode active material layer and the output (relative values)

FIG. 6 shows the relationship between the areal proportion of the first region and the output (relative values). According to this invention, therefore, it is possible to increase the output (and especially the output at low temperatures and/or the output in low SOC regions) compared to conventional constitutions consisting of a single region.

Figure 7:
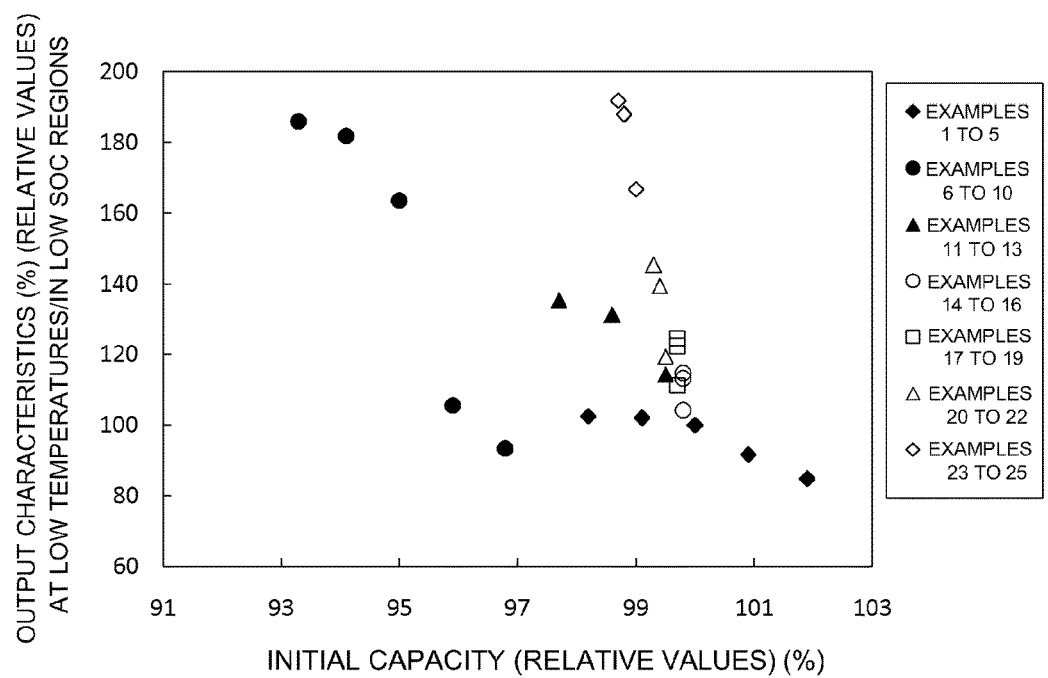
FIG. 7 is a graph that shows the relationship between the initial capacity (relative values) and output characteristics (relative values).

FIG. 7 shows the relationship between the initial capacity (relative values) and output (relative values). For example, comparing Examples 11 to 13 (shown by solid black triangles) with Examples 20 to 22 (shown by hollow triangles), in which the composition of the positive electrode active material layer was the same, Examples 20 to 22 had a higher capacity and/or a higher output. It is thought that the reason for this is that in Examples 11 to 13, in which positive active materials are mixed in a single layer, the NCM is present in the vicinity of the LFPO, meaning that the LFPO was not imparted with good electrical conductivity.

In addition, Examples 23 to 25 (shown by hollow diamonds), in which the areal proportion of the LFPO-containing first region was high at 20% (the ratio of the area of the first region to the area of the second region was between 15:85 and 25:75), exhibited higher outputs than Examples 20 to 22 (shown by hollow triangles). Conversely, Examples 14 to 16 (shown by a hollow circles), in which the areal proportion of the LFPO-containing first region was low at 3%, exhibited higher capacities than Examples 20 to 22 (shown by hollow triangles). Therefore, it was understood that the areal ratio of the first region and the second region should be adjusted according to the intended use or application of the battery, and so on.

As shown above, by providing a first region that contains (mainly) LFPO in the positive electrode active material layer, it is possible to increase the output in low SOC regions (for example, regions in which the SOC is 30% or lower) while suppressing a reduction in battery capacity caused by an increase in the quantity of electrically conductive material. It is thought that the reason for this is that the LFPO has a low driving potential and has a Li charging and discharging potential of approximately 3.4 V (vs. $Li/Li^+$), meaning that Li is readily accepted even when the battery is in a low SOC.

This invention has been explained in detail above, but the embodiments shown above are merely exemplary, and the invention disclosed here includes embodiments obtained by variously modifying or altering the specific examples shown above.

What is claimed is:

1. A non-aqueous electrolyte secondary battery including a positive electrode, a negative electrode and a liquid non-aqueous electrolyte, wherein
the positive electrode includes a positive electrode current collector and a positive electrode active material layer formed on the positive electrode current collector,
the positive electrode active material layer has two regions that are demarcated in the surface direction of the positive electrode current collector, which are a first region containing mainly a positive active material of lithium iron phosphate having an olivine crystal structure and a second region containing mainly a positive active material of a lithium-transition metal composite oxide having a layered and/or a spinel crystal structure, and
an areal proportion of the first region is 3 to 20% when a total area of the positive electrode active material layer is 100%;
the areal portion of the first region is formed continuously.

2. The non-aqueous electrolyte secondary battery according to claim 1, wherein the proportion of the positive active material of lithium iron phosphate is 90 mass % or higher when a total solid content contained in the first region is 100 mass %.

3. The non-aqueous electrolyte secondary battery according to claim 1, wherein
the positive active material of lithium iron phosphate is particulate, and
electrically conductive carbon is attached to the surface of particles of the positive active material of lithium iron phosphate.

4. The non-aqueous electrolyte secondary battery according to claim 1, wherein
the positive electrode current collector has a length extending from one end to the other end and a width,
the positive electrode active material layer is formed along the length of the positive electrode current collector, and
the first region is provided at the one end of the positive electrode current collector in the length direction.

5. The non-aqueous electrolyte secondary battery according to claim 1, wherein
the positive electrode current collector has a length extending from one end to the other end and a width,
the positive electrode active material layer is formed along the length of the positive electrode current collector, and
the first region is provided in only the central part of the positive electrode active material layer in the length direction.

6. The non-aqueous electrolyte secondary battery according to claim 5, wherein
the second region is provided on both end parts of the positive electrode active material layer which is other than the central part in the length direction.

7. The non-aqueous electrolyte secondary battery according to claim 1, wherein
the positive electrode current collector has a length extending from one end to the other end and a width,
the positive electrode active material layer is formed to a band along the length of the positive electrode current collector, and
the first region is formed along the edge of the positive electrode current collector in a width direction.

8. The non-aqueous electrolyte secondary battery according to claim 7, wherein
the second region is formed in a band and disposed along the first region in a width direction.

9. The non-aqueous electrolyte secondary battery according to claim 1, wherein
the positive electrode current collector has a length extending from one end to the other end and a width,
the positive electrode active material layer is formed on both surfaces of the positive electrode current collector along the length of the positive electrode current collector, and
a first surface of the positive electrode current collector comprising
the first region formed in a band from one end in the length direction and
the second region formed in a band and disposed in a portion other than the first region.

10. The non-aqueous electrolyte secondary battery according to claim 9, wherein
the first region is not formed in a second surface of the positive electrode current collector.

11. The non-aqueous electrolyte secondary battery according to claim 9, wherein
the first region has a rectangular shape in a cross section view.

12. The non-aqueous electrolyte secondary battery according to claim 9, wherein
the second region has a rectangular shape in a cross section view.

\* \* \* \* \*